J. F. GIDDENS.
EYE TESTING DEVICE.
APPLICATION FILED MAY 29, 1920.
1,384,252.
Patented July 12, 1921.
3 SHEETS—SHEET 1.
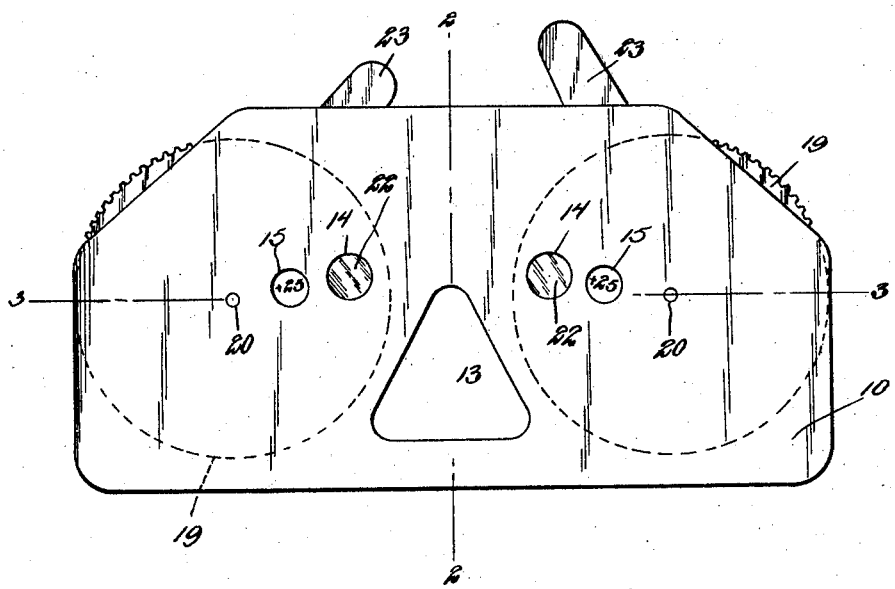
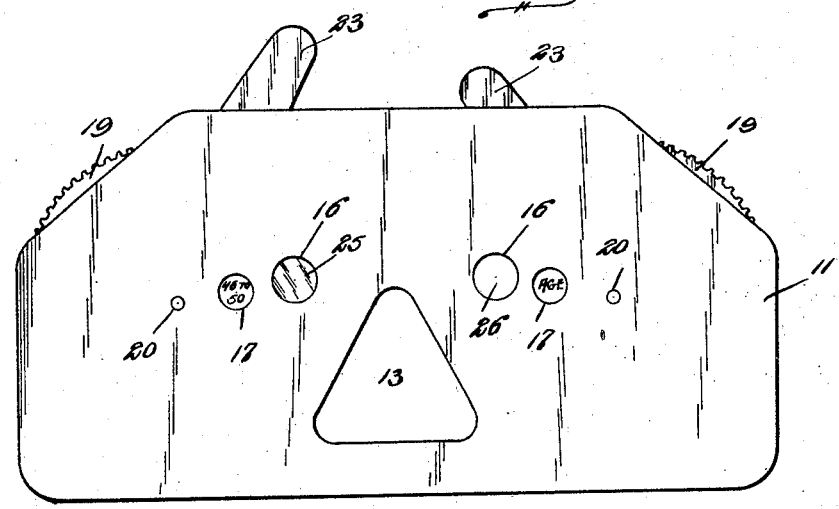
J. F. Giddens,
INVENTOR
BY Victor J. Evans.
ATTORNEY
WITNESSES:

J. F. GIDDENS.
EYE TESTING DEVICE.
APPLICATION FILED MAY 29, 1920.
1,384,252.
Patented July 12, 1921.
3 SHEETS—SHEET 2.
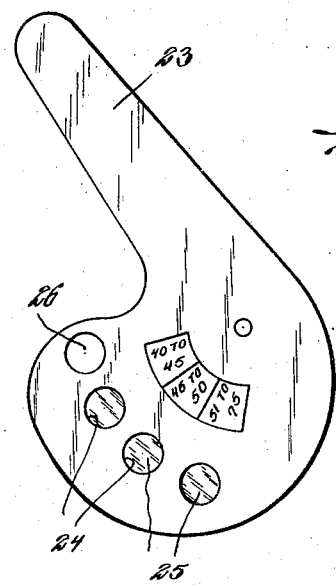
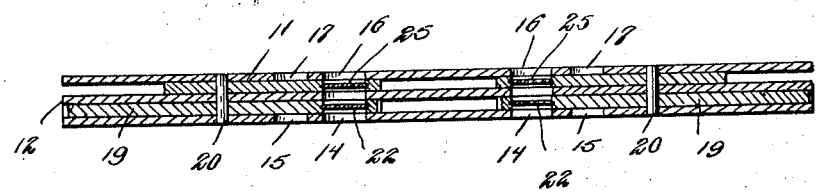
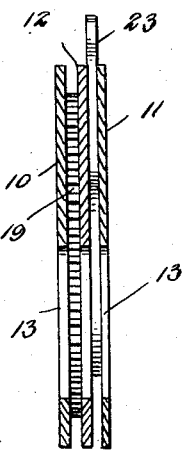
J. F. Giddens,
INVENTOR
BY Victor J. Evans.
ATTORNEY
WITNESSES:

J. F. GIDDENS.
EYE TESTING DEVICE.
APPLICATION FILED MAY 29, 1920.
1,384,252.
Patented July 12, 1921.
3 SHEETS—SHEET 3.
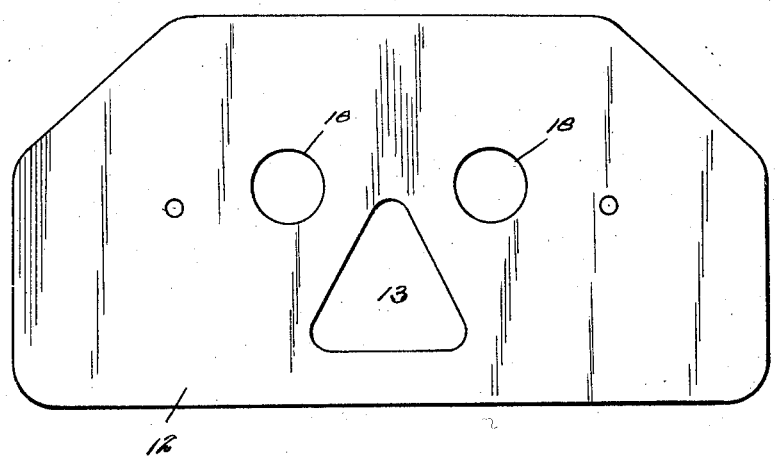
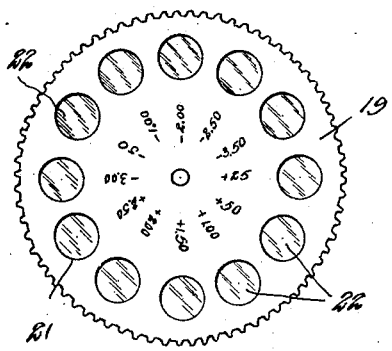
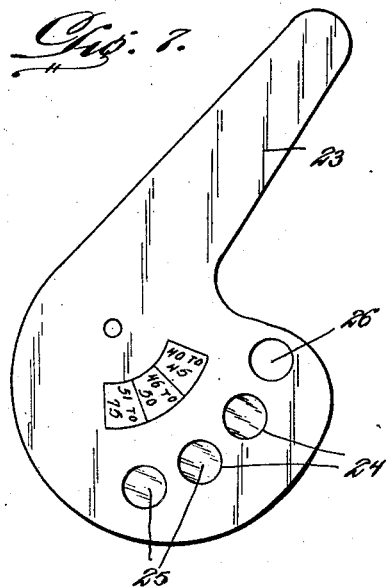
J. F. Giddens,
INVENTOR
BY Victor J. Evans.
ATTORNEY
WITNESSES:

UNITED STATES PATENT OFFICE.

JAMES F. GIDDENS, OF MOREHEAD CITY, NORTH CAROLINA.

EYE-TESTING DEVICE.

1,384,252.  Specification of Letters Patent.  Patented July 12, 1921.

Application filed May 29, 1920. Serial No. 385,236.

*To all whom it may concern:*

Be it known that I, JAMES F. GIDDENS, residing at Morehead City, in the county of Carteret and State of North Carolina, have invented new and useful Improvements in Eye-Testing Devices, of which the following is a specification.

This invention relates to devices for testing vision and has for an object the provision of a simple, inexpensive and easily operated device, by means of which the necessary lenses for correction may be readily adjusted and their proper number simultaneously brought into view.

Another object is the provision of an eye testing device in which the ordinary correction lenses may be readily adjusted and in addition, lenses of extra strength brought into position for the correction of presbyopia.

With the above and other objects in view, the invention further includes the following novel features and details of construction, to be hereinafter more fully described, illustrated in the accompanying drawings and pointed out in the appended claims.

In the drawings:—

Figure 1 is a front elevation of an eye testing device embodying the present invention.

Fig. 2 is a sectional view on the line 2—2 of Fig. 1.

Fig. 3 is a similar view on the line 3—3 of Fig. 1.

Fig. 4 is a rear elevation through the invention.

Fig. 5 is an elevation of the intermediate plate.

Fig. 6 is a view of one of the lens carrying disks.

Figs. 7 and 8 are views of the left and right hand lens levers.

Referring specifically to the drawings wherein like characters of reference denote corresponding parts, the invention as illustrated is made up of a plurality of spaced plates which include a front plate 10, a rear plate 11, and an intermediate plate 12. Each of these plates is provided with a preferably triangular opening 13 for the passage of the nose of a patient, while the front plate is also provided upon each side of the nose opening with a vision opening 14 and a reading opening 15. The rear plate is likewise provided upon each side of the nose opening 13 with a vision opening 16 and a reading opening 17, while the intermediate plate 12 is provided upon each side of the nose opening with a relatively large opening 18.

Mounted between the front plate 10 and the intermediate plate 12 upon each side of the nose opening 13 is a disk 19. These disks are mounted to revolve upon pivots 20 and are provided with openings 21 arranged in circular formation and in which are positioned lenses 22. Arranged opposite each of the lenses 22 is the number of the lens, the number upon one side of the diameter of the disk being plus while those upon the opposite side are minus. It is of course obvious that these numbers may vary, the purpose being to provide indicia adjacent each of the lenses to indicate the strength of the lens. The lenses 22 are so disposed that they may be brought into register with the vision openings 14, while the indicia opposite each of these lenses will simultaneously appear within the reading opening 15 so that the number of the lens may be plainly read. The periphery of the disks 19 may be roughened or serrated so as to be easily revolved.

Mounted upon the pivots 20 between the rear plate 11 and the intermediate plate 12 is a lever 23, the latter extending beyond the edges of the plates so as to provide an operating handle. The opposite ends of the levers 23 are offset and provided with openings 24 arranged concentrically with respect to the pivots 20, certain of these openings being provided with lenses 25 while the opening 26 is a blank. Arranged radially with respect to the openings 24 is indicia which includes the age of the patient, the indicia shown ranging from 40 to 75 years, that being the years within which persons are usually afflicted with presbyopia. For this reason the lenses 25 are preferably of extra strength. It is of course apparent that additional foci lenses for the correction of astigmatism may be added or substituted for any of the lenses already shown, the lenses of various strengths for the correction of any other defects of vision may be also added or substituted.

As illustrated in Fig. 1 of the drawings, the proper lenses for the adjustment of vision may be moved into position within the openings 14, the disks 19 being independently adjusted to suit the condition of each eye. When the proper lens has been adjusted the number of the lens may be readily seen within the reading openings 15. If the patient is afflicted with presbyopia, adjustment may be made of the levers 23 so as to bring the proper lens 25 within register between the openings 14 and 16, adjustment being made in conformity with the age of the patient through the medium of the indicia opposite each of the lenses 25.

The invention is susceptible of various changes in its form, proportions and minor details of construction and the right is herein reserved to make such changes as properly fall within the scope of the appended claims.

Having described the invention what is claimed is:—

1. An eye testing device embodying a plurality of spaced plates having registering openings to admit the nose and spaced registering openings upon each side of the nose openings, perforated disks mounted for rotation between the plates and having lenses in said perforations adapted to be brought into register with certain of the spaced openings, other disks rotatably mounted between the plates and also having lens covered perforations adapted to be brought into register with the first mentioned lenses and indicia carried by all of said disks and visible through the openings to determine the character of the lenses.

2. An eye testing device embodying an inner plate and outer plates positioned upon opposite sides of and spaced from the inner plate, each of said plates having an opening to admit the nose, said outer plates also having spaced openings upon each side of the nose opening and said inner plate having an opening upon each side of the nose opening in register with the nose openings in the outer plates, a pair of disks mounted for rotation upon each side of the nose opening between said plates, lenses carried by all of said disks for register with the registering openings of the plates and indicia upon the disks for register with the other openings, whereby the character of the lenses may be determined.

In testimony whereof I affix my signature.

JAMES F. GIDDENS.